Jan. 21, 1947.   J. D. DUNN   2,414,725
HITCH RELEASE
Filed April 5, 1945

Inventor

JOSEPH D. DUNN

By Clarence A. O'Brien
and Harvey B. Jacobson
Attorneys

Patented Jan. 21, 1947

2,414,725

UNITED STATES PATENT OFFICE 2,414,725

HITCH RELEASE

Joseph D. Dunn, Assumption, Ill.

Application April 5, 1945, Serial No. 586,721

1 Claim. (Cl. 280—33.15)

This invention relates to a trailer hitch for tractors and has for its object to provide a quick release without leaving the tractor.

Another object of the invention is to provide a trailer hitch which may be released from a tractor seat.

Other features and advantages will become more readily apparent from the following description and the accompanying illustrative drawing in which.

Figure 1:
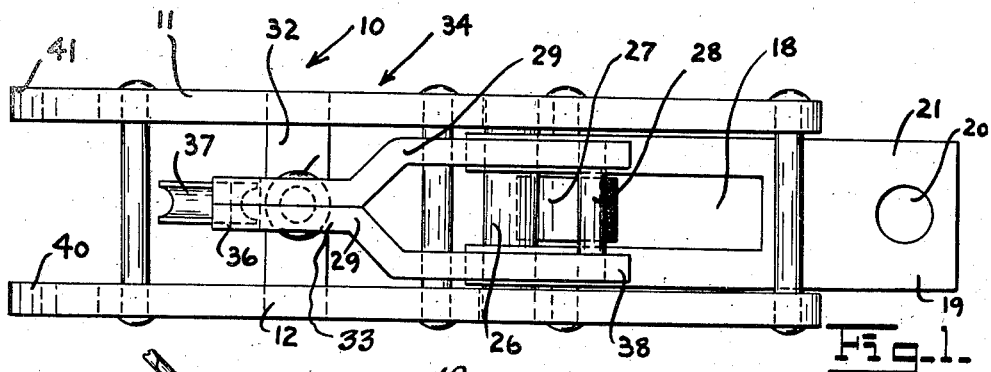
Figure 1 is a plan view of the hitch.
Figure 2:
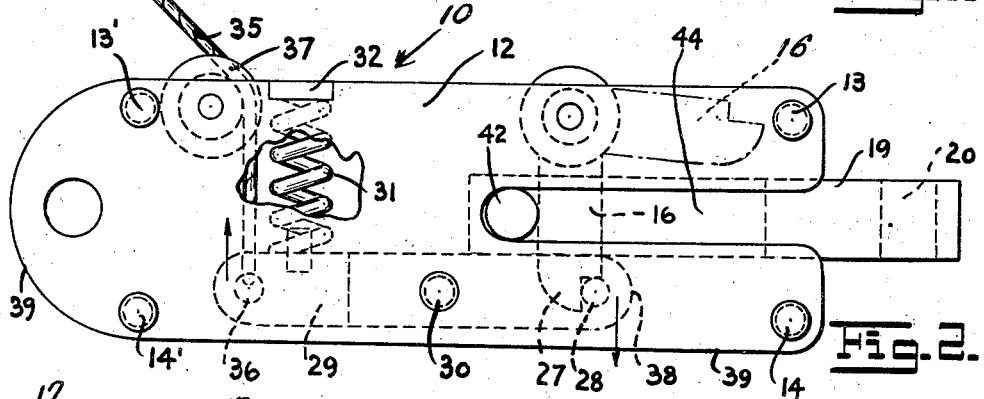
Figure 2 is a side elevational view thereof.
Figures 3, 4, 5:
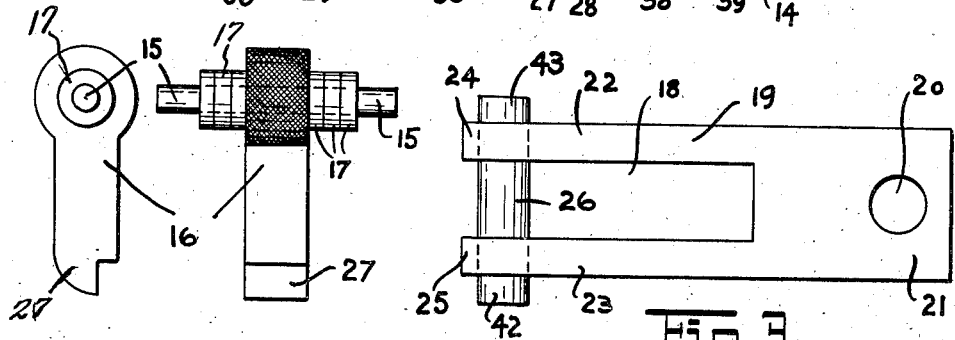
Figure 3 is a detail view of one member of the invention.
Figure 4 is a detail elevation of a latch member.
Figure 5 is another elevational view thereof.

In the accompanying drawing as above enumerated and in the following specification, like characters of reference indicate like parts throughout and in which 10, indicates a hitch to connect a wagon (or any other drawn device) to a tractor. This hitch consists of a pair of side plates 11 and 12, fixedly connected and held spaced by rivets 13 and 14, or the like. Pivotally mounted between said plates by means of a shaft 15, is a latch member 16. Spacer washers 17, on said shaft hold the member 16, centered relative to the elongated slot 18, in a tongue member 19, having a bore 20, through its outer end 21, whereby it is secured to a wagon or other trailer (not shown). The arms 22 and 23, are connected at their outer ends 24 and 25, by a pin 26. The bifurcated end of member 19, is adapted to slide in between the plates 11 and 12, and be secured therein by the latch member 16, supported by said plates 11 and 12. The hook or latch end 27, of the member 16, is engageable by a pin 28, carried by a lever 29, pivoted at 30, to the plate 12. A coil spring 31, is mounted between a cross plate 32, and the end 33, of said lever whereby the lever is held in position to hold pin 28, in the path of member 16, which in this position bears against the pin 26, of member 19, whereby the members 19 and 34, are securely held connected. However, there is a rope 35, secured to the end 36, of the lever which is trained over a sheave 37, and leads on to the seat of a tractor in order that when said rope is drawn forward it will pull end 36, of the lever against tension of spring 31, causing its outer end 38, to move toward edge 39, of plate 12, taking with it the pin 28, and releasing the latch 16, thus letting go of member 19 and separating the tractor from the trailer. The member 34, is connected to a tractor by means of a bolt (not shown) operating through the bores 39', in the ends 40 and 41, of said plates 11 and 12. The terminals 42 and 43, of the pin 26, slidably operate in the slots 44, of the plates 11 and 12.

It is thought that persons skilled in the art to which the invention relates will be able to obtain a clear understanding of the invention after considering the description in connection with the drawing. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A hitch release comprising a pair of parallel spaced side plates having an inwardly extending slot formed in the adjacent ends of each plate, rivets extending through said plates for holding the same in fixed position, of a draw bar having spaced parallel ends adapted to be inserted between said plates, a coupling pin disposed between the parallel ends of said draw bar extending above and below the same for slidable engagement in the slots in said side plates, a yoke lever having parallel arms at one end pivotally supported between said side plates, a locking pin between said parallel arms, the arms of said lever at the opposite side of its pivot converging to provide a seat, a cross plate between said side plates overlying said seat, a coil expansion spring disposed between said cross plate and seat, a sheave mounted between said side plates overlying the converging end of said yoke lever, a release cable disposed over said sheave and connected with the converging end of said yoke lever, and a centerable gravity actuated latch lever pivotally supported for swinging downwardly between said side plates between the parallel ends of said draw bar after the coupling pin is in its innermost position, the same being formed with a locking pin engaging shoulder adapted to engage the locking pin disposed between the parallel arms of said resiliently projected yoke lever.

JOSEPH D. DUNN.